(12) United States Patent
Kimmich et al.

(10) Patent No.: US 8,305,830 B2
(45) Date of Patent: Nov. 6, 2012

(54) METHOD AND CONTROL UNIT FOR OPERATING A VOLATILE MEMORY, CIRCUIT ARRANGEMENT, AND TRIP RECORDER

(75) Inventors: Franz Kimmich, Schramberg (DE); Andreas Lindinger, Floezllngen (DE); Gerhard Rombach, Triberg (DE)

(73) Assignee: Continental Automotive GmbH, Hannover (DE)

( * ) Notice: Subject to any disclaimer, the term of this patent is extended or adjusted under 35 U.S.C. 154(b) by 247 days.

(21) Appl. No.: 12/776,811

(22) Filed: May 10, 2010

(65) Prior Publication Data
US 2010/0284235 A1 Nov. 11, 2010

(30) Foreign Application Priority Data
May 11, 2009 (DE) .......................... 10 2009 020 731

(51) Int. Cl.
*G11C 5/14* (2006.01)
(52) U.S. Cl. ........................................ 365/229; 365/211
(58) Field of Classification Search .................. 365/229, 365/211; 701/1
See application file for complete search history.

(56) References Cited

U.S. PATENT DOCUMENTS

| | | | |
|---|---|---|---|
| 4,528,459 A | 7/1985 | Wiegel | |
| 5,191,529 A * | 3/1993 | Ramsey et al. ................... 701/1 |
| 5,832,194 A * | 11/1998 | Braun et al. ....................... 714/1 |
| 5,995,891 A | 11/1999 | Mayumi et al. | |
| 7,085,946 B2 | 8/2006 | Yokoyama et al. | |
| 7,184,346 B1 * | 2/2007 | Raszka et al. .................. 365/206 |
| 7,388,800 B2 | 6/2008 | Maeda | |
| 2002/0116651 A1 | 8/2002 | Beckert et al. | |
| 2005/0174164 A1 | 8/2005 | Fuhrmann et al. | |
| 2006/0133135 A1 | 6/2006 | Lachmann et al. | |
| 2006/0133181 A1 | 6/2006 | Amano | |
| 2006/0212137 A1 | 9/2006 | Sone | |
| 2006/0280012 A1 * | 12/2006 | Perner ........................... 365/212 |
| 2008/0259699 A1 * | 10/2008 | Van Berkel .............. 365/189.16 |

FOREIGN PATENT DOCUMENTS

| | | |
|---|---|---|
| DE | 39 08 324 A1 | 9/1990 |
| DE | 10 2004 005 667 A1 | 9/2005 |
| EP | 0 385 516 A2 | 9/1990 |
| JP | 2001-142508 A | 5/2001 |

* cited by examiner

*Primary Examiner* — Son Dinh
*Assistant Examiner* — Nam Nguyen
(74) *Attorney, Agent, or Firm* — Cozen O'Connor

(57) ABSTRACT

A method for operating a volatile memory supplied with a supply signal arranged either as a first supply signal of a first supply signal source or a second supply signal of a second supply signal source. If an available first supply signal is present it is used otherwise the second supply signal is used. The supply signal is supplied, based on a switch position of a switching element to the volatile memory. During a detected interrupted first supply signal, the switch position of the switching element is for a predetermined period of time such that the supply signal is supplied to the volatile memory. After expiry of the predetermined period of time, the switch position of the switching element is predetermined such that the volatile memory is decoupled electrically from the supply signal.

12 Claims, 2 Drawing Sheets

METHOD AND CONTROL UNIT FOR OPERATING A VOLATILE MEMORY, CIRCUIT ARRANGEMENT, AND TRIP RECORDER

BACKGROUND OF THE INVENTION

1. Field of the Invention

The invention relates to a method and to a control unit for operating a volatile memory.

2. Description of the Related Art

A digital trip recorder, which is also called a digital tachograph, stores events that are related to vehicle operation for a predetermined period of time on a driver-oriented chip card. Thus, for example, steering, working, standby, rest, and interruption times are stored. The collective data can be read out digitally by inspection authorities or a keeper of the vehicle in accordance with predetermined legal regulations. The storage of the data is subject to high requirements.

JP 2001142508 A discloses a circuit arrangement comprising a RAM memory which can be separated from its supply by a switching element.

US 2006/0133135 A1 discloses an array of SRAM cells driven by control electronics. In this arrangement, a voltage for supplying the SRAM cells is higher than a voltage for supplying the control electronics.

SUMMARY OF THE INVENTION

It is an object of the invention to create a method, a control unit, a circuit arrangement, and a trip recorder that provides for a particularly reliable and, at the same time, reduced-current data storage.

According to one embodiment of the invention, a method and a corresponding control unit for operating a volatile memory are supplied with a supply signal. The supply signal is arranged either as a first supply signal of a first supply signal source or as a second supply signal of a second supply signal source. When the first supply signal is available, it is used as supply signal. Otherwise the second supply signal is used as supply signal. The supply signal can be supplied to the volatile memory in dependence on a switch position of a switching element. When an interruption of the first supply signal is detected, during the detected interrupted first supply signal, the switch position of the switching element is predetermined for a predetermined period of time in such a manner that the supply signal is supplied to the volatile memory. Furthermore, the switch position of the switching element is predetermined during the detected interrupted first supply signal after the predetermined period of time has elapsed, such that the volatile memory is decoupled electrically from the supply signal. This has the advantage that at least a predetermined selection of data stored in the volatile memory can be saved before the electrical decoupling of the supply signal. Thus, necessary data, such as, e.g., accident data which occur with a high frequency or briefly before an interruption can be reliably stored. Furthermore, this increases the life of the second supply signal source and can thus contribute to avoiding an exchange of the second supply signal source.

Each respective supply signal is arranged, for example, as a respective supply voltage. The switch position of the switching element preferably remains unchanged before the detection of the interrupted first supply signal and during the present interrupted supply signal for supplying the volatile memory so that the data stored in the volatile memory as, e.g., an SRAM memory, remains stored. The volatile memory has the advantage that data occurring frequently or changing can be stored in it rapidly and without limiting the write cycles. A nonvolatile memory has typically only a limited number of write cycles. The second supply signal source is preferably arranged as rechargeable energy store.

In one embodiment of the invention, a temperature is determined that is representative of a temperature at the volatile memory. The period of time is predetermined based at least in part on the temperature that is determined. A current consumption of the volatile memory is preferably dependent on the temperature of the memory so that the predetermined period of time can be suitably adapted to the current consumption and a reliable operation of the volatile memory can thus be ensured.

In a further embodiment of the invention, the volatile memory is coupled to a nonvolatile memory. The period of time is predetermined based at least in part on a predetermined control signal that is representative of an error-free data transfer of data from the volatile memory into the nonvolatile memory. This provides for reliable saving of at least a predetermined selection of data stored in the volatile memory.

In a further embodiment of the invention, the available first supply signal is detected. The expiry of the predetermined period of time is ignored and the switch position of the switching element is predetermined in such a manner that the volatile memory is supplied with the supply signal if the detection of the available first supply signal occurs during the predetermined period of time. In the case of interruptions of the first supply signal, which are shorter than the predetermined period of time, this makes it possible that data are still present in the volatile memory and thus start-up processes in which data must be copied again into the volatile memory can be omitted.

According one embodiment of, the invention a circuit arrangement includes the volatile memory and a supply signal unit to which the first and second supply signal is allocated at the input end and the supply signal on the output end. The supply signal unit is arranged, when the first supply signal is available, to predetermine this signal and otherwise the second supply signal as supply signal at the output end. The circuit arrangement also comprises the switching element to which the supply signal is allocated at its first connection and which is electrically coupled to the volatile memory with its second connection. Furthermore, the circuit arrangement has a control unit according to the second aspect.

In one embodiment of the invention, the control unit is electrically coupled to the supply signal unit for supplying the supply signal independently of the switch position of the switching element. In the case of the available, or during the interrupted, first supply signal, this provides for a reliable operation of the control unit.

According to one embodiment of the invention, a trip recorder in a motor vehicle comprises a circuit arrangement. The first supply signal is arranged as a vehicle-system voltage signal of the motor vehicle. This provides for reliable and secure operation of the trip recorder. The interrupted first supply signal is present when an ignition of the motor vehicle is switched off or an interruption of the vehicle-system voltage signal resulting from an accident is present.

In one embodiment of the invention, the control unit is arranged to ignore the expiry of the predetermined period of time in dependence on a further predetermined control signal which represents an accident situation of the motor vehicle and to predetermine the switch position of the switching element such that the volatile memory is supplied with the supply signal if the first supply signal is interrupted. If an accident is registered, all accident data can be stored and recorded due to the continuing supply of the volatile memory by the second supply signal source. In this context, the data remains stored in the volatile memory until the supply signal source is discharged or the data has been transferred, error-free, into the nonvolatile memory.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:
In the text which follows, exemplary embodiments of the invention are explained in greater detail with reference to the diagrammatic drawings, in which.

DETAILED DESCRIPTION OF THE PRESENTLY PREFERRED EMBODIMENTS

Figure 1:
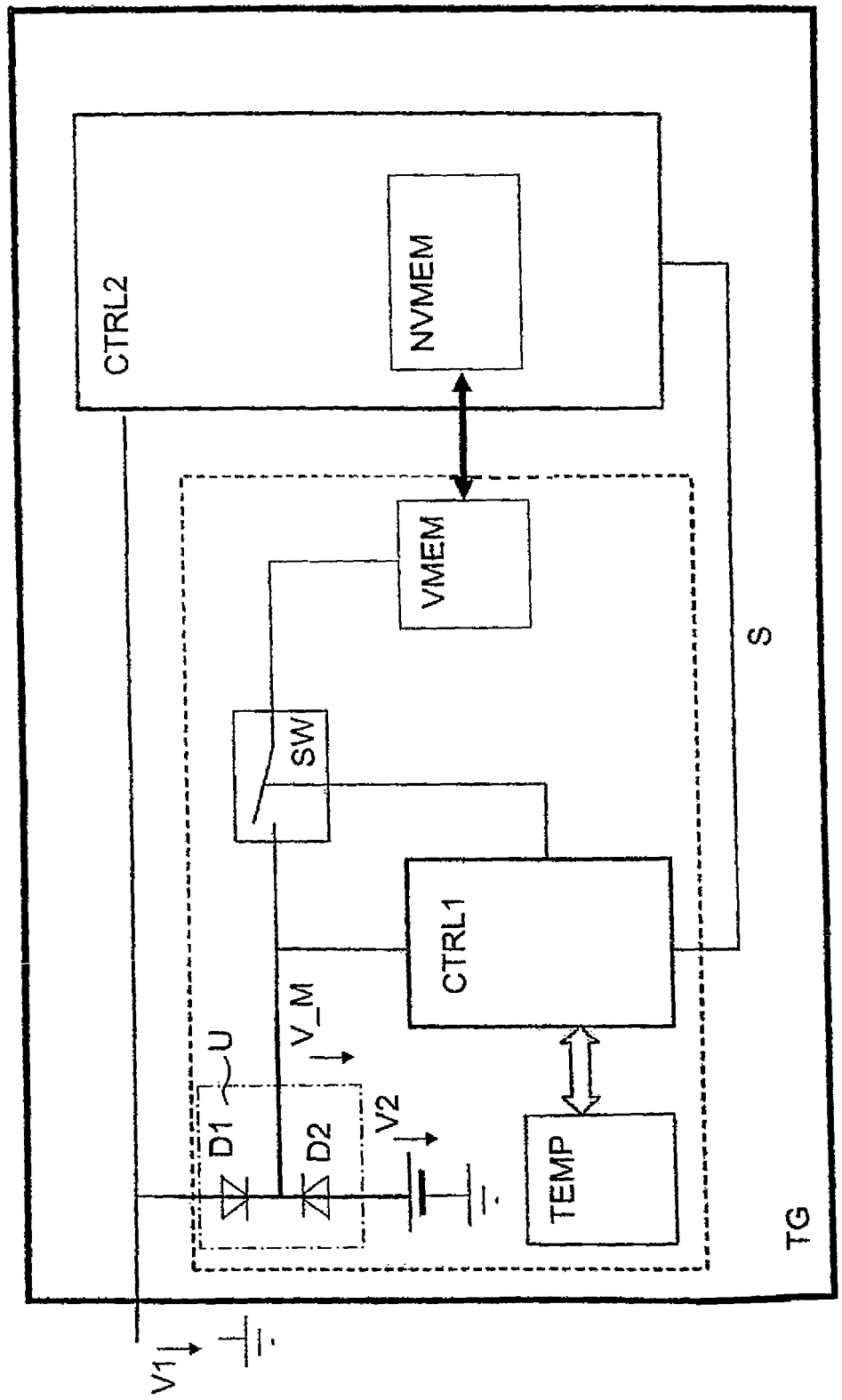
FIG. 1 is a trip recorder.

A trip recorder TG (FIG. 1) comprises a circuit arrangement with a supply signal unit U, a volatile memory VMEM, a first and second control units CTRL1, CTRL2, a switching element SW and a second supply signal source. The trip recorder TG is preferably arranged in a motor vehicle and coupled electrically to a first supply signal source, e.g., the battery of the motor vehicle. The second supply signal source is arranged, for example, as a rechargeable energy store. The first and second supply signal source, respectively, provide a first and second supply signal V1, V2.

The first and second supply signals are allocated to the input end of the supply signal unit U. The supply signal unit U comprises a first and a second diode D1, D2, which are electrically coupled to the first and second supply signal source in such a manner that a supply signal V_M is available at the output end at a common junction TP of the first and second diode D1, D2. The supply signal unit U is arranged to predetermine the first supply signal V1, if available, and otherwise the second supply signal V2 as supply signal V_M at the output end.

The common junction TP is electrically coupled to the first control unit CTRL1 for supplying it. A first terminal 1 of the switching element SW is electrically coupled to the common junction TP and a second terminal 2 of the switching element SW is electrically coupled to the volatile memory VMEM to supply the supply signal V_M to the volatile memory VMEM when the switch position of the switching element SW is switched on.

The second control unit CTRL2 comprises a nonvolatile memory NVMEM such as a flash or FRAM memory which is electrically coupled to the volatile memory VMEM to transmit stored data between the volatile memory VMEM and nonvolatile memory NVMEM. The first and second control unit CTRL1, CTRL2 are coupled to one another electrically via a control signal line via which a control signal S can be transmitted from the second control unit to the first control unit CTRL2, CTRL1. The control signal S is representative of an error-free data transfer of data from the volatile memory VMEM into the nonvolatile memory NVMEM. As an alternative or in addition, a further control signal which is representative of a detected accident situation of the motor vehicle is transmitted by the control signal line. The accident situation is detected, for example, by the second control unit CTRL2.

The first control unit CTRL1 is arranged to determine a temperature at the volatile memory VMEM by a temperature sensor TEMP. A current consumption of the volatile memory VMEM is typically dependent on a temperature at the volatile memory VMEM.

Figure 2:
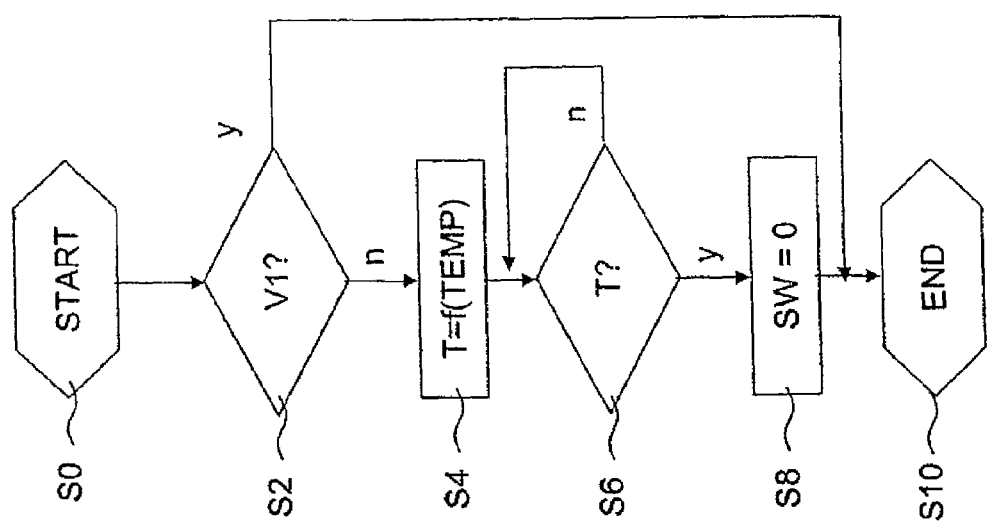
FIG. 2 is a flowchart for operating a volatile memory.

The first control unit CTRL1 is preferably arranged for processing a method for operating the volatile memory VMEM (FIG. 2). As an alternative, the first control unit CTRL1 can also be designated as control unit for operating the volatile memory VMEM.

The method is started in a step S0. Preferably, the switching element SW is switched on here, such as when the vehicle is started. In a step S2, it is detected whether the first supply signal V1 is present or is interrupted. When a first supply signal V1 is present, the method is ended in a step S10 or, as an alternative, executed again in step S2. In the case of an interrupted first supply signal V1, the switch position of the switching element SW is predetermined in such a manner that the second supply signal V2 is applied to the volatile memory VMEM by the second diode D2. In addition, the temperature at the volatile memory VMEM is determined. In a step S4, a period of time T is determined during which the switch position of the switching element SW is still switched on. The period of time T can be permanently predetermined and/or variably adjustable e.g., 3 to 60 min, and/or in dependence on the determined temperature. As an alternative or in addition, the period of time T is predetermined in dependence on the control signal S. In a step S6, it is checked whether the predetermined period of time T has expired. As an alternative or in addition, the expiry of the period of time T is ignored in dependence on a detected accident which is signaled by the further control signal, and the switch position of the switching element SW is predetermined in such a manner that the volatile memory VMEM is still supplied with the supply signal V_M even if the first supply signal V1 is interrupted. During the predetermined period of time T, the first supply signal V1 is continuously monitored in step S6. If the first supply signal V1 is present again, the method is ended in step S10. If the predetermined period of time T has expired and the first supply signal V1 is still interrupted, the switch position of the switching element SW is predetermined in a step S8 in such a manner that the volatile memory VMEM is electrically decoupled from the supply signal V_M. In step S10, the method is ended or, as an alternative, processed again in step S2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for operating a volatile memory comprising:
   supplying the volatile memory with a supply signal, the supply signal being one of a first supply signal of a first supply signal source and a second supply signal of a second supply signal source,
   wherein when the first supply signal is available, the first supply signal is used as the supply signal, otherwise the second supply signal is used as the supply signal,
   wherein the supply signal is supplied to the volatile memory based on a switch position of a switching element coupled to the volatile memory;
   detecting an interruption of the first supply signal,
      wherein, during the detected interruption of the first supply signal, the switch position of the switching element is predetermined for a predetermined period of time to couple the supply signal to the volatile memory; and
   switching the switch position of the switching element after expiration of the predetermined period of time such that the volatile memory is electrically decoupled from the supply signal.

2. The method as claimed in claim 1, further comprising:
   determining a temperature representative of a volatile memory temperature; and
   determining the predetermined period of time based at least in part on the determined temperature.

3. The method as claimed in claim 2, wherein the volatile memory is coupled to a nonvolatile memory and the period of time is determined in based at least in part on a control signal.

4. The method as claimed in claim 3, wherein the control signal is representative of an error-free data transfer of data from the volatile memory into the nonvolatile memory.

5. The method as claimed in claim 1, wherein the volatile memory is coupled to a nonvolatile memory and the period of time is determined in based at least in part on a control signal.

6. The method as claimed in claim 5, wherein the control signal is representative of an error-free data transfer of data from the volatile memory into the nonvolatile memory.

7. The method as claimed in claim 1, further comprising:
   detecting the available first supply signal,
      wherein the expiration of the predetermined period of time is ignored and the switch position of the switching element is predetermined such that the supply signal is supplied to the volatile memory if the available first supply signal is detected during the predetermined period of time.

8. A control unit for operating a volatile memory to which a supply signal is supplied, the supply signal being arranged one of a first supply signal of a first supply signal source and as a second supply signal of a second supply signal source, wherein in the case of an available first supply signal, the first supply signal is used as supply signal and otherwise the second supply signal is used as supply signal, wherein the supply signal is supplied to the volatile memory based on a switch position of a switching element, the control unit comprising:
   a detector configured to detect an interruption of the first supply signal; and
   a switch control, wherein during the detected interruption of the first supply signal the switch position of the switching element is predetermined for a predetermined period of time in that the supply signal is supplied to the volatile memory, and after expiration of the predetermined period of time, the switch position of the switching element is switched such that the volatile memory is electrically decoupled from the supply signal.

9. A circuit arrangement comprising
   a volatile memory;
   a supply signal unit supplying a supply signal to the volatile memory, comprising a first supply signal of a first supply signal source and a second supply signal of a second supply signal source, wherein in the case of an available first supply signal, the supply signal unit being arranged to provide the first supply signal as the supply signal, or otherwise the second supply signal is provided by the supply signal unit to the volatile memory;
   a switching element to which the supply signal unit is coupled at a first terminal and which is coupled electrically to the volatile memory at a second terminal; and
   a control unit configured to at least control the switching element, the control unit comprising a detector configured to detect an interruption of the first supply signal; and
      a switch control, wherein during the detected interruption of the first supply signal the switch position of the switching element is predetermined for a predetermined period of time in that the supply signal is supplied to the volatile memory, and after expiration of the predetermined period of time, the switch position of the switching element is switched such that the volatile memory is electrically decoupled from the supply signal.

10. The circuit arrangement as claimed in claim 9, in which the control unit is electrically coupled to the supply signal unit and configured to supply the supply signal independently of the switch position of the switching element.

11. The circuit arrangement as claimed in claim 9, configured as a trip recorder, wherein the first supply signal is arranged as vehicle-system voltage signal of a vehicle.

12. The trip recorder as claimed in claim 11, wherein the control unit is configured to respond to a control signal that represents an accident condition of the vehicle to ignore the expiration of the predetermined period of time and to predetermine the switch position of the switching element such that the supply signal is supplied to the volatile memory if the first supply signal is interrupted.

* * * * *